May 28, 1968  A. L. ARMENTROUT  3,385,068
METHOD OF MAKING TRENCH DAM
Filed Nov. 14, 1966
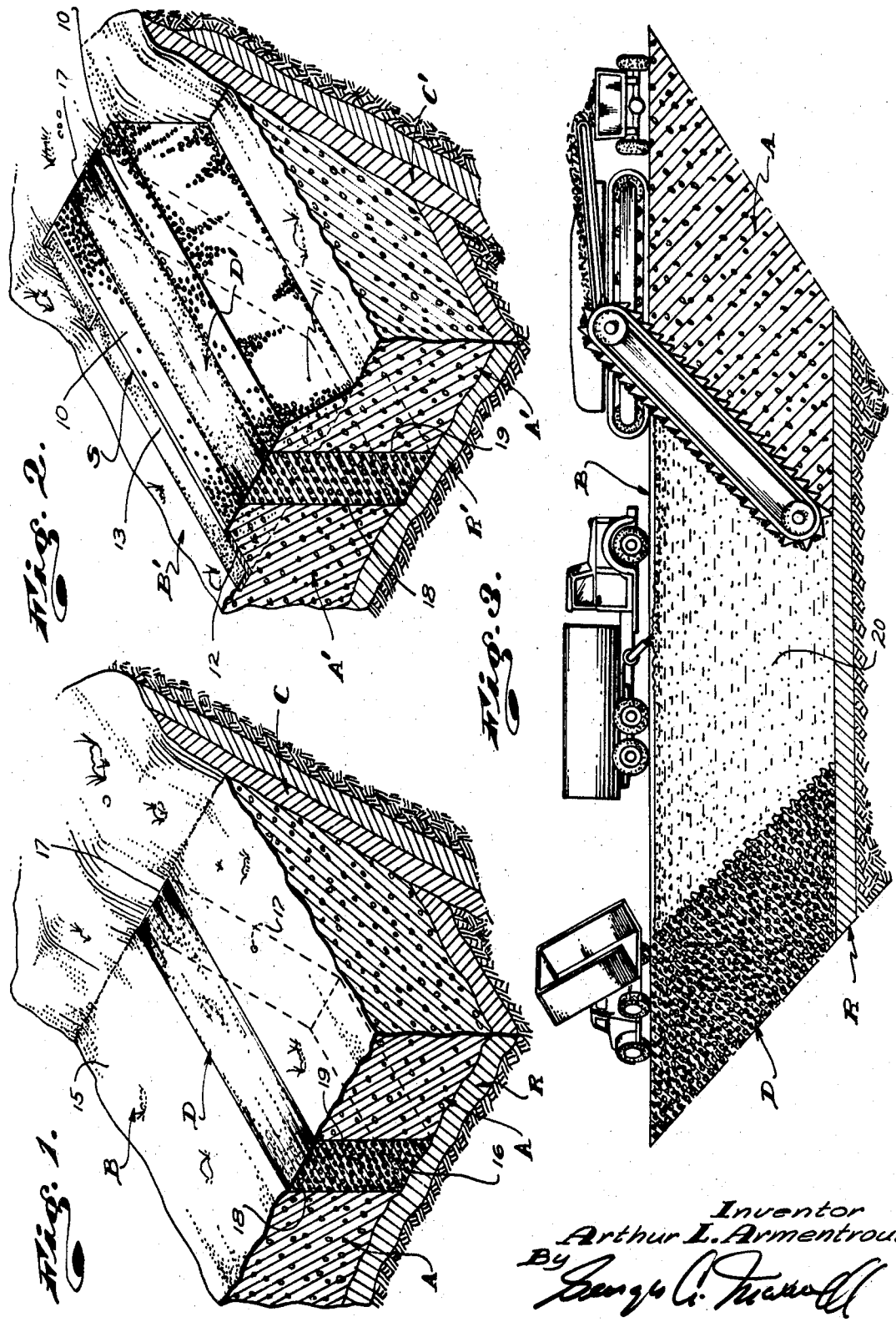
Inventor
Arthur L. Armentrout
By
Attorney

United States Patent Office 3,385,068
Patented May 28, 1968

3,385,068
METHOD OF MAKING TRENCH DAM
Arthur L. Armentrout, 455 E. Ocean Blvd.,
Long Beach, Calif. 90802
Filed Nov. 14, 1966, Ser. No. 593,923
9 Claims. (Cl. 61—1)

ABSTRACT OF THE DISCLOSURE

The method of making an impervious aggregate and clay filled dam including washing an aggregate or aggregates of rock, gravel and sand to remove all lubricous material, next, screening and dividing the aggregate into groups of granules of substantially equal size and equal volume, with the size of granules of each group of granules being approximately twice the size of the next smaller size group of granules, the size of granules going to make up the group of smallest size granules being larger than one-thirty-second of an inch (1/32), next, commingling the groups of granules to establish an aggregate, next, mixing the aggregate with a volume of dry, expansible, impervious clay sufficient to fill the interstices established by the granules when the granules are in bridging contact with each other and when the clay is moistened, next, or simultaneously with mixing the aggregate and clay, digging a trench along a dam site and filling the trench as it is established with mud slurry to shore the trench and simultaneously establishing and/or depositing the aggregate and clay mixture in the trench behind and following said slurry of mud whereby the mud is displaced and progressively advanced through the trench by the admixture and whereby the clay is moistened by the water in the mud.

---

This invention has to do with a dam structure and the method of making the same and is more particularly concerned with that type of dam structure which is installed beneath the earth's surface and is generally referred to as a "trench dam."

In the art of controlling the flow of subterranean and surface waters, dam structures are employed.

In the case of controlling the flow of surface waters, dams are constructed across the beds along which the water flows to project above the beds. Frequently, such dams consist of rock, gravel, sand, dirt and silt collected or gathered from and about the immediate vicinity or site of the dam and piled or stacked up as by means of bulldozers and other similar and familiar earth moving and handling equipment. Such dams are frequently or commonly refered to as "earth filled dams."

Frequently, where circumstances require, the beds below earth filled dams are excavated and the dams are constructed to extend downwardly into such excavations to cut off sub-surface flow of water and to provide a foundation for the structure of the dam.

The back or upstream side of earth filled dams are frequently provided with a facing or skin of concrete to stop or impede the seepage and flow of water into the earth fill therebehind and to stop or impede washing and sluffing away of the earth's fill by the water backed or stopped by it.

Such earth filled dams have proved to be of questionable effectiveness and have in any number of cases proved to be extremely dangerous. All to frequently when the earth fill of such dams becomes wet by the seepage of water into it, it becomes so soupy and fluid that it will not support itself, much less the adjacent body of water which is normally under considerable head. Accordingly, when the fill of such dams become wet, they frequently rupture and blow out, creating flood situations downstream. The list of such dams is very long. For detailed consideration of such dam failures, attention is directed to the publication "Earth Dam Projects" by Joel D. Justin, C.E., 1932, subject, "Failures of Earth Dams," pages 7 through 10 and 43 through 50. Also, subject, "Stratigraphy & Sedimentation," pages 135 to 136. Reference is further made to the publication "Engineering for Dams" by Justin, Hinds, Creager, vol. III, 1958, see Table I—Partial List of Earth Dam Failures, pages 660 to 661. Reference is also made to the publication "Earth and Earth-Rock Dams" by Sherard, Woodward, Gizienski, and Clevenger, 1963, pages 113 to 199—"Failures and Damages," and "Unsatisfactory Performance of Earth Dams," pages 113 through 123 and page 131.

In spite of the above, such dams are constantly being established throughout the country as flood control means and for the purpose of establishing reservoirs, since they are extremely inexpensive as compared with other more stable and permanent types of dam structures. It is apparently reasoned that a poor dam structure of very questionable dependability and effectiveness is better than no dam at all, where a more permanent and stable type of dam structure is not considered economically feasible.

In the case of sub-surface trench dams, that is, that type of dam where it is sought to stop the flow of sub-surface waters in the alluvial deposit of a river or creek bed, the prior art has developed and employed several methods of establishing damming structures in such beds. These methods have characteristically involved the digging and establishment of suitable ditches or trenches in and across the alluvial beds, which trenches extend to bed rock or a sub-surface strata of impervious clay, or the like, and are filled with a mixture of clay mixed into a slurry and a volume of rock, gravel, sand, dirt and silt material gathered from the ditches or trenches which were excavated, or collected from about or near the dam site, with no concern with its contents or granular characteristics.

While such trench dams are often sufficiently satisfactory to merit their establishment and use, they are not truly dependable and all too frequently only serve to partially and/or temporarily establish and maintain the desired damming effect.

This is due to the fact that the rock, gravel, sand, dirt and silt employed in establishing the fill do not establish a stable and structurally sound mass with the clay slurry, and the fill is so soupy, fluid and unstable that it will readily flow and be displaced when subjected to a head of water. As a result of the above, such cut off or trench dams are, like earth filled dams, subject to failure and are not dependable.

I have found that in both of the above-noted kinds or classes of dam structures, as established by known methods, one or more of the following factors result in a failure or want of effectiveness and/or dependability.

First, in common uncleaned, unwashed rock, gravel, sand silts and the like, such as are found in and about river and creek beds or washes, there is frequently an abundance or a large percentage of fine, often colloidal, as well as larger particle sizes of lubricous materials, such as talc and/or fine micaceous schist and silts, which materials, particularly when wet, not only lubricate and permit easy relative movement between large particles in bearing engagement with each other, but also lubricate and enhance the ability of materials in which they are carried or suspended to flow.

Second, the indiscriminate combining of rock, gravel, sand, dirt and silt without reference to relative size of the granules and the relative volume of the various sizes of granules employed, to establish a fill aggregate, will not result in a fill wherein a first, substantial and stable bridging structure is established. Rather, the indiscriminate combining of such materials results in fills which are prone or subject to having soft, weak, unstable parts and/or portions which, when subjected to external stresses and pressures, tends to shift, yield and settle to such an extent that they are not uniform or dependable and do not have any particular strength.

Presently, in the art, it is common practice to simply employ enough material so that it is hoped it will hold and support the anticipated loads and/or forces to which it will be subjected.

Third, and finally, in those cases where impervious clays are employed in such dam structures, they are not suitably treated or acted upon so as to make them set up into a firm plastic mass, but are simply deposited in the dug trench in the form of a soupy slurry mixture of the rock, gravel, sand, dirt and silt that was dug out of the trench at one end and dumped back in at the other end. Accordingly, the structure is not stable and is not adequately supported and contained to prevent it from flowing and being displaced.

An object of this invention is to provide a novel dam structure which is stable and impervious.

Another object is to provide a novel method of establishing a stable and impervious dam structure.

Yet another object of my invention is to provide a novel dam structure and a novel method of establishing such a structure which is particularly suitable in establishing trench dams and stable cores for earth filled dams having super-structures above their related river or creek beds.

Another feature of my invention is to provide a washed rock, gravel and sand aggregate which has been cleaned of all lubricous material, classified as to granule size and reconstituted of predetermined volumes of different predetermined granule sizes whereby the granules of the resulting aggregate establish a uniform stable bridging material which can be used for an entire dam.

Another object and feature of my invention is to provide a dam structure and novel method of establishing the same in which impervious clays are employed, and said clays are chemically treated and/or acted upon whereby said clays set to establish an impervious, firm, plastic mass which is such that it will not flow when subjected to the pressures to be encountered in the resulting dam structure, but is sufficiently plastic and/or flexible so that it will not crack and/or separate when moved or shifted as might occur as a result of subsidence of the dam site or as a result of earthquake and the like.

A further object of this invention is to provide a structure and a method of the character referred to which is economical of material.

It is a further object to provide a method of the character referred to which is fast, easy and economical to carry out.

It is an object of the invention to provide a novel and improved impervious, stable damming structure which is such that it can be advantageously established or incorporated in existing earth filled dam structures of questionable stability and safety and so as to stabilize and make such earth filled dams safe.

The foregoing and other features and objects of my invention will be fully understood from the following detailed description of typical preferred forms and applications of my invention, throughout which description reference is made to the accompanying drawings, in which:

FIG. 1 is an isometric sectional view of a trench dam established in accordance with my invention;

FIG. 2 is an isometric sectional view of an impervious aggregate filled dam as provided by this invention; and, FIG. 3 is a diagrammatic view illustrating the carrying out of my new method.

In FIG. 1 of the drawings, I have shown an isometric view of a trench dam D as provided by the present invention established in an alluvial deposit A, which deposit establishes or defines a river or creek bed B. The deposit A is shown as being supported at its bottom by bed rock R or a strata of impervious material or the like, and defined at its sides by impervious rock or a deposit of impervious material C.

In FIG. 2 of the drawings, I have shown an isometric sectional view of an earth filled dam D' as provided by the present invention established in and upon an alluvial deposit A' establishing a river or creek bed B'. The deposit A' is shown as being supported at its bottom by bed rock R' and defined at its sides by a deposit of impervious material C'.

In each case, the dams extend tranverse the beds B and B', that is, transverse the direction in which the water flows therethrough or thereacross. The dam structures extend laterally from one side C or C' to the other and downwardly and into the bed rock R or R'.

The earth filled dam D' is similar to the trench dam D except that it includes, in addition to the dam D', an elongate, transversely extending, upwardly projecting, uninterrupted piled up or stacked deposit of earth defining a super-structure S above the bed B' and in and through which the dam D' extends.

The super-structure S is shown as having a substantially flat top 10 and front and rear inclined surfaces 11 and 12. The rear or upstream surface is shown as having a protective skin 13 of concrete or the like.

The super structure S which occurs above the bed B' and in which the dam structure D' occurs, can be established in accordance with common practice, that is, by simply piling up and stacking rock, gravel, sand, dirt and silt, and the like, from the immediate vicinity of the dam site, by means of bulldozers and other suitable earth handling equipment, or, if desired, by importing and depositing suitable materials of the nature referred to by trucks and the like. However, the dirt and silt should be washed out of the rock, gravel and sand before it is piled and stacked for the super structure, adding a good grade of clay to fill the interstices so the entire structure is impervious.

It will be apparent that the dam D' or D is and may be called a core structure in the super-structure S of the earth filled dam, which core can, if necessary or desired, extend or continue downwardly into and/or through the alluvial deposit A' into which establishes the bottom of the river bed B'.

The dam D and the dam or dam core D' in the two forms of the invention are alike and are vertical, wall-like structures arranged in the deposit A or in the deposit A' and superstructure S. The dam structures D and D' have flat top surfaces 15 flush with the bed B or top 10 of the super-structure S, bottom surfaces 16 engaging and sealing with the bed rock R, as desired, ends 17 joined with the formations at and defining the opposite sides of the beds B and B', and flat, substantially vertical front and rear surfaces 18 and 19.

The dam D or core D' are established of an aggregate or rock, gravel and sand which has been washed and cleaned of substantially all lubricous materials, such as micaceous shist, talc, silt, dirt, and the like, and a suitable impervious expansible clay, such as bentonite or Rosamond Lake clay which is preferably combined with or contains a small percent (5% to 10%) of suitable accelerator, such as calcium hydroxide or portland cement to cause the clay to set up and harden into a firm stiff plastic mass.

The cleaned aggregate is of a special and unique nature and is unlike natural deposits of rock, gravel, sand, dirt and silt.

Natural deposits of such materials are made up of a random and variable number of different granule sizes of rocks, gravel, sand, dirt and silt, and the volumes of the different sizes of granules going to make up such natural deposits are seldom if ever such that a bridging structure of maximum determinable stability and strength is or can be established thereby. Generally, there are too few different granule sizes of such material and the relative volumetric proportioning of the different sizes of material is such that a rather unstable and somewhat fluid structure is established when the materials are combined in bridging relationship. Further, when so combined, the materials of larger particulate size establish interstices through which the materials of lesser particulate size are free to migrate, thus resulting in a rather loose and open structure of very questionable stability, strength and permanence.

The above special and unique cleaned aggregate that I provide in carrying out the present invention is made up of rock, gravel and sand classified to size and made up of approximately equal volumes of predetermined, screened sizes of such materials. The resulting aggregate which may be termed a "reconstructed" aggregate is especially engineered to establish a very stable bridging structure of determinable strength and porosity.

To obtain the above desired stable bridging structure, the equal volumes of the different predetermined screened sizes of classified material are combined and mixed so that the granules of each size of rock, gravel and/or sand, when arranged in bridging relationship with each other, establish interstices through which the next smaller size of granules will not freely migrate.

In practice, and in the preferred carrying out of the invention, the smallest size granules, preferably of sand, are 1/16 inch, all other sizes being larger and increasing progressively so as to result in the above-noted combination and relationship of parts.

The largest being 6 inches or eight inches in diameter. The screening is done after the material is washed and cleaned.

The following screen sizes are recommended:

TABLE I

| Number | Screen Size | | Known as Size |
|---|---|---|---|
| | Through Opening | Stop Opening | |
| 9 | 16" | 8" | #16" |
| 8 | 8" | 4" | #8" |
| 7 | 4" | 3" | #4" |
| 6 | 2" | 1" | #2" |
| 5 | 1" | 1/2" | #1" |
| 4 | 1/2" | 1/4" | #1/2" |
| 3 | 1/4" | 1/8" | #1/4" |
| 2 | 1/8" | 1/16" | #1/8" |
| 1 | 1/16" | 1/32" | #1/16" |
| minus 1/32"=rejects | | | |

Equal volumes of the above screened sizes produce a very stable aggregate, starting with No. 1 (#1/16") as the smallest.

It is apparent that size No. 8 may contain many sizes between minus 8" and plus 4". Likewise, No. 7 may contain many sizes between minus 4" and plus 2", and so on through the entire size range.

It will be apparent that a lesser number of different sizes of granules can be used with equal success, for example, an aggregate made up of approximately equal volumes of Nos. 1 through 5, where a supply of the larger numbers or sizes of granules are not available, will establish a satisfactory dam structure in accordance with my invention.

It will be apparent from the above, that the resulting aggregate bridge structure is a substantially uniform structure of determinable strength porosity.

It has been determined that an aggregate bridging structure established in accordance with the above has a porosity of approximately 30%.

In practice, the aggregate can be established of washed and cleaned native rock, gravel and/or sand or can be imported, as desired or as circumstances require.

Further, in the preferred carrying out of the invention, it is desirable that the granules going to make up the aggregate be ovoidal in exterior configuration and be free of sharp, thin, weak and fragile corners, edges and the like.

For example, it has been determined that a most effective and stable, strong bridging structure of the character referred to is established when the particles going to make up the aggregate have a Krumbein sphericity between .5 to .9 and Krumbein roundness between .5 to .9, and a Moh's hardness in excess of 5.

When it is not economically feasible to obtain and use aggregate materials which are ovoidal in shape, as set forth above, crushed rock, gravel and/or sand, suitably classified as to size, grouped as a volume and reconstructed, in accordance with the foregoing, can be employed. While the resulting bridge structure established thereby would be less effective and stable than a bridge structure established of materials having the desired ovoidal shape, it would be far superior to a bridging structure established of unclassified and ungrouped granules of materials of desired or preferred configuration as might be taken from natural deposits.

The clays that I employ can be bentonite or Rosamond Lake clay, or a native clay, which, like bentonite or Rosamond Lake clay, is such that it can be dried and ground up into granular and/or powder form for easy handling, mixing and blending with other dry materials, such as the aggregate that I provide, and which is such that when wetted or moistened it will swell slightly and weld together to establish an impervious integral, firm plastic mass.

Where saltwater will come in contact with the dam structure, Sepiolite type clays should be used, as this material works satisfactorily in the presence of either fresh or saltwater.

Further, the clays are such that they will, when chemically treated by a suitable accelerator, such as calcium hydroxide, set up and harden to establish a tough, stiff, plastic mass.

In carrying out my invention, the dam structure includes a sufficient volume of impervious clay, such as set forth above, to fill all of the interstices established by the aggregate. In other words, about 30% of such clay.

Further, in practice, the clay contains from 5% to about 10% calcium hydroxide or a large or lesser percentage of one of the many other accelerators that might be employed, such as portland cement.

For a more complete and comprehensive explanation and understanding of the type and nature of clays that can be employed in carrying out my invention, and of the accelerators that may be used in connection therewith to gain the sought after end result, reference is made to my Patent No. 3,028,913, issued Apr. 10, 1962, and entitled "Recovering Lost Circulation in Wells."

In accordance with the foregoing, it will be apparent that the dam structure or structures that I provide include an elongate, impervious damming structure made up of an aggregate of washed and cleaned rock, gravel and sand of water insoluble mineral classified as to size and reconstructed with predetermined volumes of each size whereby the granules of each smaller size of granules will not freely migrate through the interstices established by each larger size of granules when said larger size of granules are in bridging contact with each other and the several granules of different size granules establish a substantially uniform, uninterrupted bridging structure of predetermined mean porosity and an integral uninterrupted stiff plastic clay filler of impervious clay in and throughout the interstices of the aggregate and in sealing engagement about and between the granules thereof. The dam structures have substantially flat, vertical front and back surfaces in supporting bearing engagement with opposing surfaces of an elongate, upwardly opening trench in and extending transverse an elongate, alluvial deposit on the earth's surface defining a river bed and/or in and extending longitudinally through an elongate earth filled dam extending transverse of and projecting upwardly from an elongate river bed.

The method of establishing a dam in accordance with my invention includes, first, digging an elongate upwardly opening trench in and transversely across an elongate alluvial deposit and into an imprevious sub-strata in the earth, from one side of the deposit to the other and downwardly into the sub-strata. Such a trenching operation can be carried out by any suitable means, such as a trencher machine (see FIG. 3), a dredging machine, backhoe machine, or the like.

The method further includes filling the trench behind the trenching machine with a suitable pumpable mud slurry 20, such as is used in the drilling of oil wells and which is commonly referred to as rotary drilling mud, and for the purpose of shoring the side walls of the trench.

For the purpose of this disclosure, the mud will be referred to as a pumpable shoring mud 20.

Subsequent to the introduction of the shoring mud into the trench and following close behind the mechanical trenching means or machine, a dry mixture of bridging aggregate and impervious expansible clay, as specified above, is continuously introduced into the trench behind the shoring mud and so as to continuously displace and advance the body of shoring mud in the trench as the trench is established.

The dry mixture is firmly tamped into place. This eliminates any shrinking or cracking of the impervious "trench dam" as the mixture always fills the trench, dry or moist.

The dry mixture of aggregate and clay picks up sufficient water from the shoring mud to moisten the clay and cause it to expand and completely fill the interstices established by the aggregate, to weld together and establish a stiff, impervious firm plastic clay mass in and throughout the aggregate and to establish sealing and locking engagement in and with the impervious strata and the adjacent surfaces of the trench established by the alluvial bed in which said trench is established.

It is to be noted that the mixture of aggregate and clay D and D' is not wetted and made soupy and in the nature of a slurry when deposited into the trench behind the slurry of shoring mud 20 and, as a result, does not tend to flow into and mix with the said shoring mud. Rather, the dry aggregate, and clay, as it is introduced into the trench, displaces the shoring mud, in advance thereof.

It will be apparent that with the foregoing method, the trench is filled as it is established and that it is only open for a short distance at any one time during which it is filled with the shoring mud.

It will be further apparent that my method requires a relatively small amount of shoring mud at any one time and that the small amount which is robbed by the somewhat hygroscopic clay and aggregate mixture deposited in the trench can be easily and readily replaced as construction of the dam and carrying out of my method progresses.

Having described only typical preferred forms and applications of my invention, I do not wish to be limited or restricted to the specific details herein set forth, but wish to reserve to myself any modifications and/or variations that may appear to those skilled in the art and which fall within the scope of the following claims:

Having described my invention, I claim:

1. The method of making an impervious aggregate filled dam including, combining substantially equal volumes of groups of washed granules of rock, gravel and sand, each group of granules being screened and classified to a size, the screen size of granules of each group of granules being approximately twice the screen size of the granules of the next smaller size group of granules, the granules of the smallest size group being larger than $\frac{1}{32}$ of an inch, commingling the groups of granules to establish an aggregate, next, mixing the aggregate with a volume of impervious clay sufficient to fill the interstices established by the granules when said granules are in bridging contact with each other and depositing the commingled aggregate and clay mixture in a dam site.

2. A method as set forth in claim 1 wherein the clay is a dry expansible clay and which further includes subjecting the deposited commingled aggregate and clay mixture to moisture to expand and weld the clay.

3. A method as set forth in claim 1 wherein the dam site is a trench established in the earth bisecting a water conducting formation transverse the direction flow through said formation.

4. A method as set forth in claim 1 wherein said dam site is an elongate trench in which the commingled aggregate and clay mixture is established and which includes the steps of digging the trench progressively from one end of the site to the other, shoring the trench with a slurry of mud preparatory to depositing the commingled aggregate and clay mixture and depositing said aggregate and clay mixture progressively from said one end of the site to the other behind and following said slurry of mud whereby the mud is displaced and progressively advanced through the trench by the aggregate and clay mixture.

5. A method as set forth in claim 1 wherein the dam site is a trench established in the earth bisecting a water conducting formation transverse the direction flow through said formation, said clay is a dry expansible clay, said method including the final step of subjecting the aggregate and clay mixture to moisture to expand and weld the clay.

6. A method as set forth in claim 1 wherein said dam site is an elongated trench in which the commingled aggregate and clay mixture is established and which includes the steps of digging the trench progressively from one end of the site to the other, shoring the trench with a slurry of mud preparatory to depositing the commingled aggregate and clay mixture and depositing the commingled aggregate and clay mixture progressively from said one end of the site to the other behind and following said slurry of mud whereby the mud is displaced and progressively advanced through the trench by the aggregate and clay mixture, said clay being an expansible clay and dry when mixed with the aggregate, said clay being moistened by said mud when deposited in the dam site whereby the clay expands and welds together.

7. A method as set forth in claim 1 wherein the granules of the several groups of granules are classified as to shape and have Krumbein indices of sphericity between .5 and .9 and Krumbein indices of roundness between .5 and .9.

8. A method as set forth in claim 1 wherein the granules of the several groups of granules are classified as to shape and have Krumbein indices of sphericity between .5 and .9 and Krumbein indices of roundness between .5 and .9, said clay is a dry expansible clay, said method including the final step of subjecting the aggregate and clay mixture to moisture to expand and weld the clay.

9. A method as set forth in claim 1 wherein the granules of the several groups of granules are classified as to shape and have Krumbein indices of sphericity between .5 and .9 and Krumbein indices of roundness between .5 and .9, said method including the final step of subjecting the aggregate and clay to moisture to expand and weld the clay, said dam site being an elongate trench in which the commingled aggregate and clay mixture is established and which includes the steps of digging the trench progressively from one end of the site to the other, shoring the trench with a slurry of mud preparatory to depositing the commingled aggregate and clay mixture and depositing the commingled aggregate and clay mixture progressively from said one end of the site to the other behind and following said slurry of mud whereby the mud is displaced and progressively advanced through the trench by the aggregate and clay mixture, said clay being an expansible clay and dry when mixed with the aggregate, said clay being moistened by said mud when deposited in the dam site whereby the clay expands and welds together.

References Cited

UNITED STATES PATENTS

| | | | |
|---|---|---|---|
| 2,757,514 | 8/1956 | Wyatt | 61—1 X |
| 3,028,913 | 4/1962 | Amentrout | 166—29 |

FOREIGN PATENTS

| | | |
|---|---|---|
| 607,658 | 11/1960 | Canada. |
| 1,317,807 | 1/1963 | France. |
| 573,663 | 11/1945 | Great Britain. |

OTHER REFERENCES

Engineering News-Record; pp. 63 and 64, Jan. 19, 1939.

The Chemistry of Cement and Concrete; Lea and Desch; revised by Lea, 2nd edit., published by Edward Arnold, Ltd., London, England, 1956, p. 510, TA434L43 1956.

Concrete Technology and Practice; by W. H. Taylor, published by American Elsevier Publishing Company, Inc., New York, N.Y.; pp. 116 and 191, 1965, TA439T33.

EARL J. WITMER, *Primary Examiner.*